Dec. 22, 1964 H. MOGENSEN 3,162,815

SEQUENTIAL PULSE GENERATOR EMPLOYING FIRST AND SECOND DELAY MEANS CONTROLLING PULSE DURATION AND SPACING, RESPECTIVELY

Filed Nov. 2, 1961 4 Sheets-Sheet 1

| INPUT | | OUTPUT | |
|---|---|---|---|
| S | R | Z | $\bar{Z}$ |
| 1 | 0 | 0 | 1 |
| 0 | 1 | 1 | 0 |

INVENTOR.
HARRY MOGENSEN
BY
ATTORNEY

Dec. 22, 1964 H. MOGENSEN 3,162,815

SEQUENTIAL PULSE GENERATOR EMPLOYING FIRST AND SECOND DELAY MEANS CONTROLLING PULSE DURATION AND SPACING, RESPECTIVELY

Filed Nov. 2, 1961 4 Sheets-Sheet 2

INVENTOR.
HARRY MOGENSEN
BY Samuel Cohen
ATTORNEY

Dec. 22, 1964 H. MOGENSEN 3,162,815

SEQUENTIAL PULSE GENERATOR EMPLOYING FIRST AND SECOND DELAY MEANS CONTROLLING PULSE DURATION AND SPACING, RESPECTIVELY

Filed Nov. 2, 1961 4 Sheets-Sheet 3

INVENTOR.
HARRY MOGENSEN
BY [signature]
ATTORNEY

Dec. 22, 1964 H. MOGENSEN 3,162,815

SEQUENTIAL PULSE GENERATOR EMPLOYING FIRST AND SECOND DELAY MEANS CONTROLLING PULSE DURATION AND SPACING, RESPECTIVELY

Filed Nov. 2, 1961 4 Sheets-Sheet 4

INVENTOR.
HARRY MOGENSEN
BY Samuel Cohen
ATTORNEY

United States Patent Office 3,162,815

Patented Dec. 22, 1964

3,162,815

SEQUENTIAL PULSE GENERATOR EMPLOYING FIRST AND SECOND DELAY MEANS CONTROLLING PULSE DURATION AND SPACING, RESPECTIVELY

Harry Mogensen, Levittown, N.J., assignor to Radio Corporation of America, a corporation of Delaware Filed Nov. 2, 1961, Ser. No. 149,732

13 Claims. (Cl. 328—62)

This invention relates to pulse generators. The invention is useful in digital data processing ssytems although it is not restricted to this use.

The object of the invention is to provide a circuit which produces pulses which are all of the same, precise duration and which are spaced from one another the same or different time intervals.

The circuit of the invention includes a plurality of flip-flops and input gates to the flip-flops for producing control pulses which set and reset the flip-flops. A first delay means common to all of the gates controls the duration of all pulses. A second delay means common to all of the gates or a second and one or more other delay means controls the spacing between pulses.

The invention is described in greater detail below and is illustrated in the following drawing of which:

FIGS. 1*a*–1*e* are diagrams to explain the symbols employed in FIG. 2;

Figures 1A, 1B, 1C, 1D, 1E:
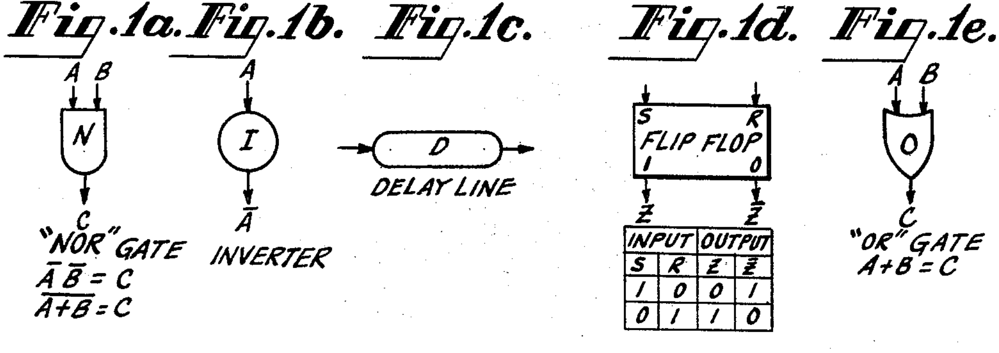

Similar reference letters are used in the various figures. Elements in FIG. 4 which are similar to corresponding elements in FIG. 2 carry the same reference numerals plus 100 as the elements in FIG. 2.

A number of blocks shown in the figures represent known circuits. The circuits of the blocks are actuated by electrical signals applied to the blocks. When a signal is at one level, it represents the binary digit "one" and when it is at another level, such as zero volts, it represents the binary digit "zero." For the sake of the discussion which follows, it may be assumed that a high level signal represents the binary digit "one" and a low level signal the binary digit "zero." Also, to simplify the discussion, rather than speaking of an electrical signal being applied to a block or logic stage, it is sometimes stated that a "one" or a "zero" is applied to a block or logic stage.

Throughout the figures capital letters are used to represent signals indicative of binary digits. For example, A may represent the binary digit "zero" or the binary digit "one." $\overline{A}$ represents the complement of A. In some cases, letters are employed in Boolean equations as a convenient means for describing the circuit operation.

Figure 2:
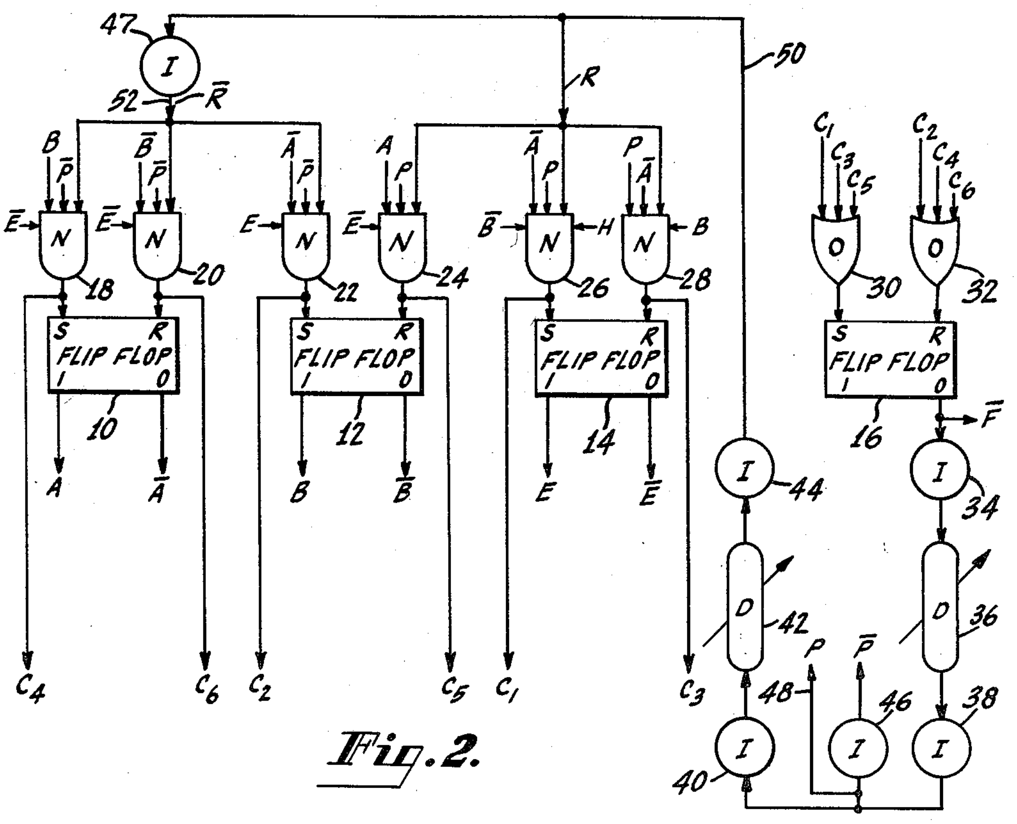
FIG. 2 is a block circuit diagram of a form of the present invention in which the spacing between pulses is the same.
Figure 4:
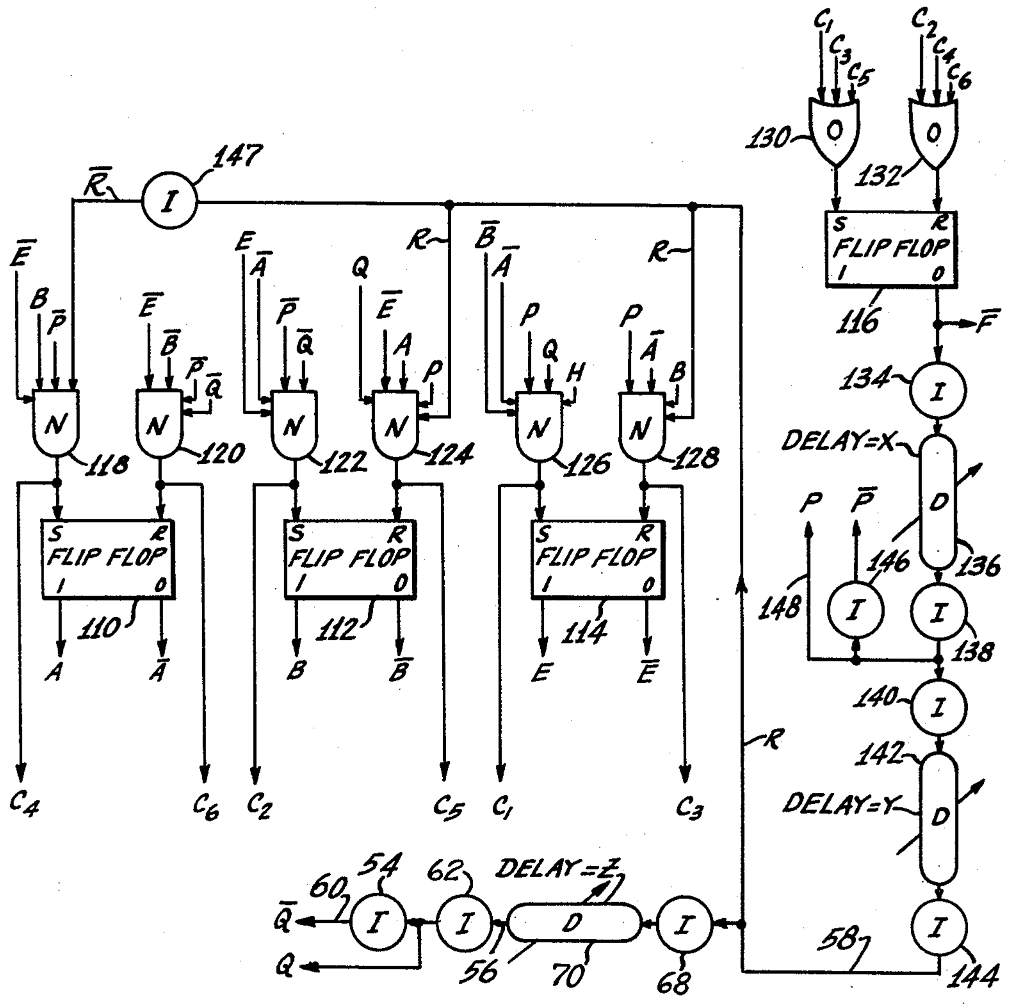
FIG. 4 is a block circuit diagram of a form of the invention in which the spacing between pulses can be different.

A number of elementary logic circuits are present in FIGS. 2 and 4. The symbols which are employed in FIGS. 2 and 4 and, in some cases, their Boolean equations, are shown in FIGS. 1*a* through 1*e*. For example, FIG. 1*a* illustrates a "nor" gate which is also sometimes known as a "none" gate. This gate may consist of an "and" gate which has an inverter in series with each of its input leads. Alternatively, it may consist of an "or" gate followed by an inverter. There may be two or more inputs to the gate. Regardless of the way in which the "nor" gate is implemented, its Boolean equations (for the two input case) are the ones shown in FIG. 1*a*.

The convention adopted for a flip-flop is somewhat different than that usually employed. When the flip-flop is set, it produces a "one" output at its 0 output terminal and a "zero" output at its 1 output terminal. When the flip-flop is reset, it produces a "one" output at its 1 output terminal and a "zero" output at its 0 output terminal. This is shown in FIG. 1*d*.

One form of the invention is shown in FIG. 2. The circuit includes flip-flops 10, 12, 14 and 16, input "nor" gates 18–28 for setting and resetting flip-flops 10, 12 and 14, and input "or" gates 30 and 32 for setting and resetting flip-flop 16. The 0 output of flip-flop 16 is applied through an inverter 34 and delay line 36 to a second inverter 38. The output of inverter 38 is applied through a third inverter 40 and delay line 42 to a fourth inverter 44. The output of the second inverter 38 is also applied to a fifth inverter 46. The output of inverter 44 is applied as one input to "nor" gates 24, 26 and 28 and is also applied through a sixth inverter 47 as an input to "nor" gates 18, 20 and 22.

The various flip-flop outputs are fed back in different ways as inputs to the "nor" gates. For example, the B output of flip-flop 12 and $\overline{E}$ output of flip-flop 14 serve as inputs to "nor" gate 18. The outputs of the "nor" gates are the control pulses. As there are six such gates, the system produces six pulses in time sequences. These are legended $C_1$ through $C_6$. The control pulses $C_1$, $C_3$ and $C_5$ are applied as inputs to "or" gate 30 (upper right of figure). The control pulses $C_2$, $C_4$ and $C_6$ serve as inputs to "or" gate 32.

It will be shown shortly that the delay line 36 controls the duration of pulses $C_1$–$C_6$. This delay line may be fixed or controllable, as shown. It will also be shown that the delay line 42 controls the spacing between pulses. This delay line also may be fixed or controllable.

Figure 3:
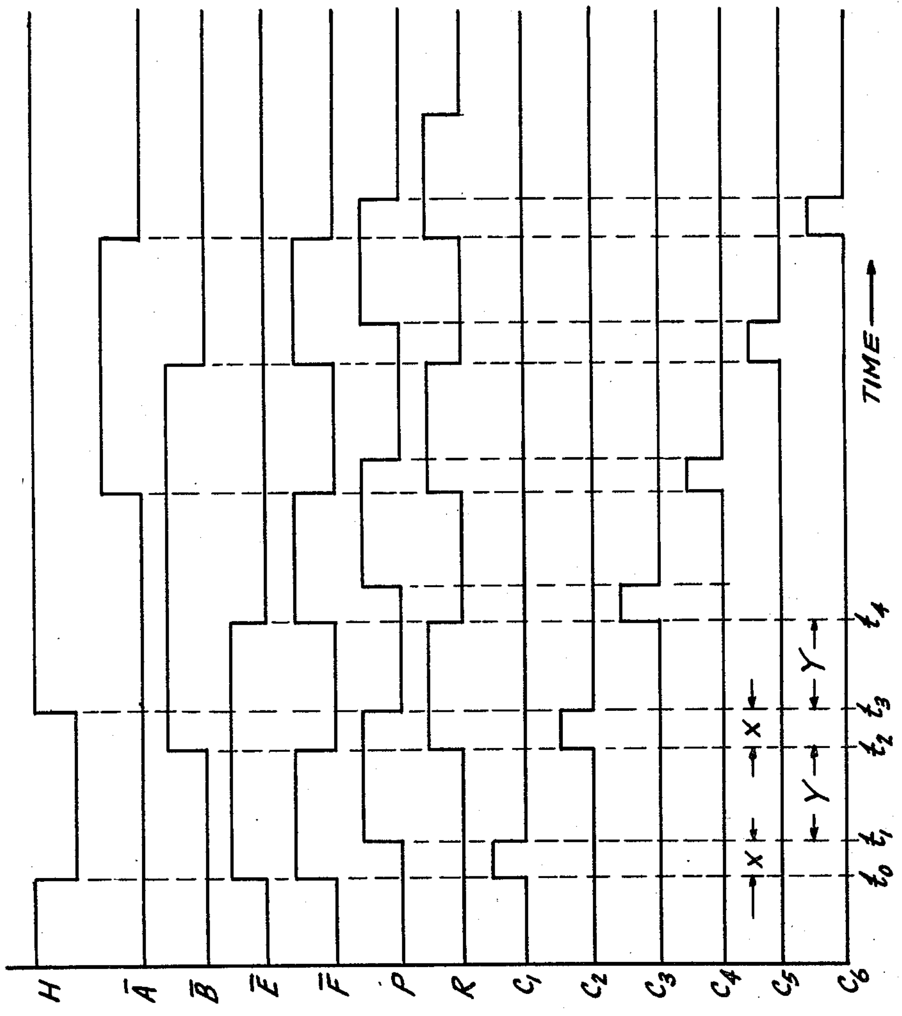
FIG. 3 is a drawing of waveforms present at various places in the circuit of FIG. 2.

In the discussion which follows of the operation of the circuit of FIG. 2, both FIGS. 2 and 3 should be referred to. It may be assumed that initially all of the flip-flops are reset. The reset means is not shown in the figure, however, it may include a pulse generator in the program area of the computer which is connected to the reset terminal of all flip-flops. The reset flip-flops produce outputs $\overline{A}$, $\overline{B}$, $\overline{E}$ and $\overline{F}$ all equal to "zero." The H input to "nor" gate 26 is initially a "one" so that this gate is inactivated. All other gates are also disabled.

In order to start the pulse generator, H is changed from "one" to "zero." This occurs at time $t_0$. When H changes to "zero," all of the inputs to "nor" gate 26, namely $\overline{B}$, $\overline{A}$, P, R and H are "zero" and this "nor" gate therefore conducts and produces a $C_1=1$ pulse. The $C_1$ pulse sets flip-flop 14. The $C_1$ pulse is also applied through "or" gate 30 to the set terminal of flip-flop 16 and sets this flop-flop.

When flip-flop 16 is set, $\overline{F}$ changes to "one." This signal is inverted by inverter 34 and the resulting "zero" signal is delayed an interval X by delay line 36. The delayed "zero" signal is inverted by inverter 38 and appears as a signal $P=1$ at lead 48. The P signal is one of the inputs to "nor" gate 26. Accordingly, when it changes to "one," "nor" gate 26 is disabled and $C_1$ changes to "zero."

From the foregoing description it is clear that the duration of pulse $C_1$ is substantially equal to the delay inserted by delay line 36. Accordingly, this delay line, if varied, varies the pulse duration.

The $P=1$ signal is applied through inverter 40 to delay line 42. The delayed signal is applied to inverter 44 and appears as a delayed "one" signal at lead 50. The "one"

signal is inverted by inverter 47 and appears as a $\overline{R}=0$ signal at lead 52.

$\overline{R}$ is one of the inputs to "nor" gate 22. The other inputs are $\overline{A}$ which is equal to "zero," $\overline{P}$ which is equal "zero" also, and E which is now also equal to "zero" (flip-flop 14 is still set). Accordingly, all of the inputs to "nor" gate 22 are "zero" and this gate conducts and produces the pulse $C_2$.

From the discussion above, it is clear that the spacing between the lagging edge of pulse $C_1$ and the leading edge of pulse $C_2$ is equal to the delay Y inserted by delay means 42. Here and in the case of delay means 36, the delays inserted by the inverters and other stages are ignored since they are relatively small compared to the delays inserted by the delay lines and, like the delays inserted by the delay lines, remain fairly constant. A control of the delay inserted by delay means 42 is therefore a suitable means for controlling the spacing between the pulses $C_1$ and $C_2$.

During the time control pulse $C_2$ is generated, a $R=1$ signal is applied to "nor" gates 24, 26 and 28 inactivating these gates. Similarly, a $\overline{E}=1$ signal is applied to "nor" gates 18 and 20 inactivating these gates. Thus, the only gate which is enabled is "nor" gate 22. It can be shown that in any case in which one of the "nor" gates is enabled, all other "nor" gates are disabled.

The control pulse $C_2$ serves as an input to "or" gate 32. The pulse $C_2$ therefore resets flip-flop 16 changing $\overline{F}$ to "zero." After the delay inserted by delay line 36, $\overline{P}$ changes from "zero" to "one" disabling gate 22 and terminating pulse $C_2$. Since the delay line 36 also controlled the duration of pulse $C_1$, it is clear that the pulses $C_1$ and $C_2$ are of precisely the same duration. It can be shown that the delay line 36 also controls the duration of pulses $C_3$–$C_6$ and therefore six pulses, $C_1$–$C_6$, are of the same duration.

After the delay inserted by delay means 42, R changes to "zero." R serves as one of the inputs to "nor" gate 28. All other inputs to this "nor" gate, namely P, $\overline{A}$ and B are all "zero." Control pulse $C_2$ previously set flip-flop 12 changing B from "one" to "zero." Therefore, "nor" gate 28 is enabled and produces the pulse $C_3$. As in the previous case, the spacing between the lagging edge of pulse $C_2$ and the leading edge of pulse $C_3$ is determined by delay line 42. Accordingly, the spacing between pulses $C_2$ and $C_3$ is precisely the same as that between pulses $C_1$ and $C_2$. It can be shown that the same condition holds for the remaining pulses and that therefore the spacing between each succeeding pulse is precisely the same.

From the discussion above and from the drawing of waveforms of FIG. 3, it can readily be seen how the remaining pulses $C_4$, $C_5$ and $C_6$ are generated.

The circuit of FIG. 4 is, in many respects, similar to the one of FIG. 2. However, the circuit of FIG. 4 includes, in addition to all of the elements of the circuit of FIG. 2, inverters 68, 62, and 54 and a delay means 70. The latter introduces a delay Z which may be fixed or of controllable duration. Moreover, rather than being a delay line, element 70 may be an asynchronous stage which produces an output signal at lead 56 after an interval dependent on the time required by the stage to perform its function. As one example, element 70 may be an asynchronous adder.

One further difference between the circuit of FIG. 4 and the one of FIG. 2 is that the permutations of input signals to the "nor" gates is somewhat different in the circuit of FIG. 4 than in the circuit of FIG. 2. Also, some of the inputs to the "nor" gates are now the Q and $\overline{Q}$ signals which are not available in the circuit of FIG. 2.

Figure 5:
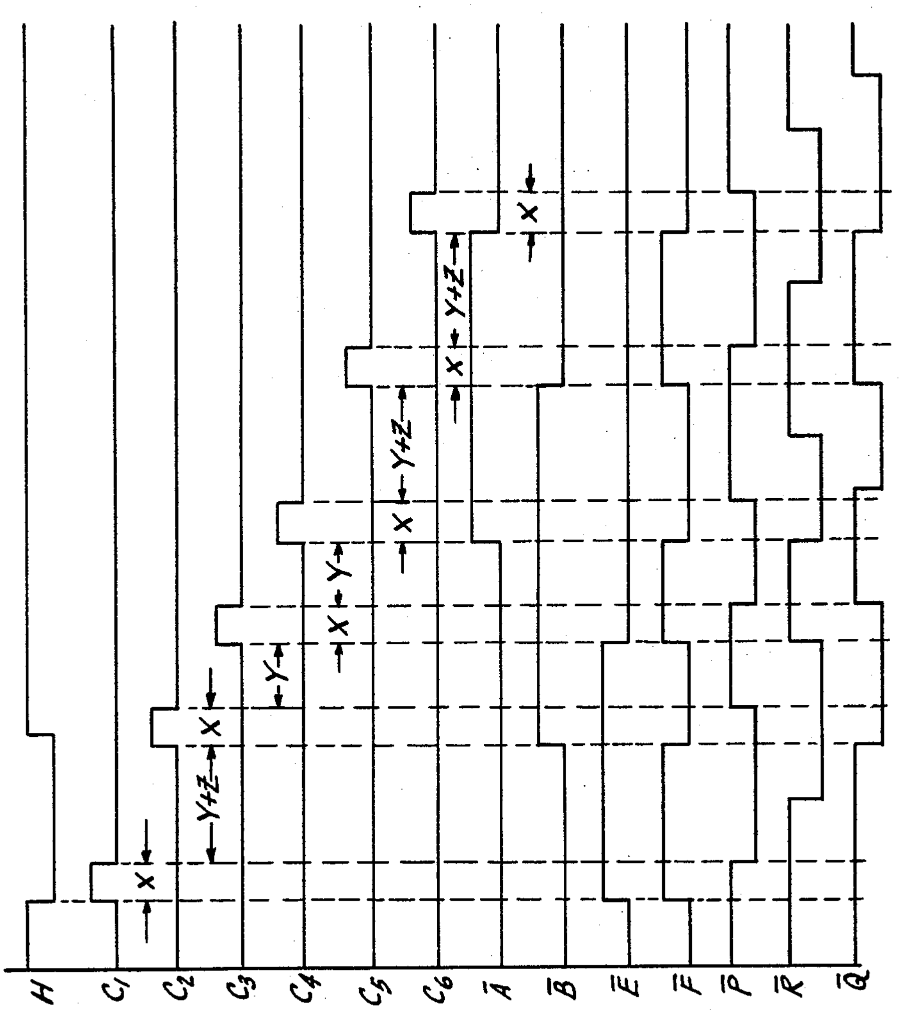
FIG. 5 is a drawing of waveforms present at various places in the circuit of FIG. 4.

In the discussion which follows of the operation of the circuit of FIG. 4, both FIGS. 4 and 5 should be referred to. As in the case of the circuit of FIG. 2, all of the flip-flops in the circuit of FIG. 4 are initially reset. When H, the pulse generator start signal, is changed from "one" to "zero," all of the inputs to "nor" gate 126 are "zero." The "nor" gate therefore conducts and produces a $C_1=1$ pulse. The $C_1$ pulse sets flip-flop 114. The $C_1$ pulse is also applied through "or" gate 130 to the set terminal of flip-flop 116 and sets this flip-flop.

When flip-flop 116 is set, $\overline{F}$ changes to "one." This signal is inverted by inverter 134 and the resulting "zero" signal is delayed an interval X by delay line 136. The delayed "zero" signal is inverted by inverter 138 and appears as a signal $P=1$ at lead 148. The P signal is one of the inputs to "nor" gate 126. Accordingly, when it changes to "one," "nor" gate 126 is disabled and $C_1$ changes to "zero." Thus, the duration of pulse $C_1$ is substantially equal to the delay X inserted by delay means 136.

The $P=1$ signal is applied through inverter 140, delay means 142, and inverter 144 to lead 58. Thus, an $R=1$ signal appears on lead 58 an interval Y after the signal $P=1$ appears. The $R=1$ signal is applied through inverter 68, delay means 70, inverter 62 and inverter 54 to lead 60. Accordingly, an interval Z after the signal $R=1$ appears, a signal $\overline{Q}=0$ appears.

The signal $\overline{Q}=0$ is one of the inputs to "nor" gate 122. All of the other inputs to this gate are also "zero." Accordingly, this gate conducts and produces the $C_2=1$ control pulse. It is clear from the foregoing description that the interval between the lagging edge of control pulse $C_1$ and the leading edge of control pulse $C_2$ is the interval $Y+Z$, that is, the delays inserted by delay means 142 and 70.

From the drawing of waveforms of FIG. 5 and the foregoing discussion it can readily be seen how the pulses $C_3$, $C_4$, $C_5$ and $C_6$ are generated. Analysis of the circuit shows that the spacing between pulses $C_1$ and $C_2$, $C_4$ and $C_5$, and $C_5$ and $C_6$ is an interval $Y+Z$. The spacing between pulses $C_2$ and $C_3$, and $C_3$ and $C_4$ is an interval Y. The duration of each pulse, regardless of the interval between pulses, is the same, namely X.

It should be appreciated that other spacings between pulses are possible with different permutations of inputs to the "nor" gates. It should also be appreciated that although in the pulse group illustrated, the spacing between pulses is first longer, then shorter, and then longer, other combinations of spacings are possible. Further, although in the embodiment illustrated only two delay means 142 and 70 are employed for controlling the spacing between pulses, additional delay means may be used to obtain additional permutations of pulse spacing intervals.

The circuits of FIGS. 2 and 4 produce six control pulses. It should be appreciated, however, that the invention is not limited to one which produces only six pulses. For example, if the number of flip-flops is increased from four to five, and the number of input "nor" gates are increased to eight, eight control pulses can be produced. Other similar circuits can be designed for producing many more than eight or fewer than six pulses.

The circuits of FIGS. 2 and 4 employ "nor" gates. The circuit can use instead other types of logic gates as, for example, "and" gates, provided the proper permutations of the input signals to these gates are chosen.

What is claimed is:

1. In a circuit for generating a plurality of spaced pulses, each appearing on a separate output line; a first delay means coupled to all of said lines, for controlling the pulse duration; and a second delay means coupled to all of said lines for controlling the spacing between pulses.

2. In a circuit for generating a plurality of spaced pulses, each appearing on a separate output line;

first means, including a delay means having a delay $\Delta t_1$, coupled to all of said lines for terminating each pulse an interval substantially equal to $\Delta t_1$ after each pulse starts; and second means, including a second delay means having a delay $\Delta t_2$, coupled to all of said lines for starting each pulse an interval substantially equal to $\Delta t_2$ after the termination of the previous pulse.

3. A pulse generator comprising,
a plurality of flip-flop stages;
input gates to the flip-flop stages for producing control pulses for setting and resetting the flip-flop stages;
a first delay means coupled to all of said gates for making each pulse of the same duration;
and a second delay means coupled to all of said gates for making the spacing between pulses of the same duration.

4. A pulse generator comprising,
a plurality of flip-flop stages which produce output signals at two different levels when set, and which produce output signals of complementary value when reset;
input gates to the flip-flop stages responsive to different permutations of the flip-flop output signals for producing control pulses for setting and resetting the flip-flop stages;
a first delay means responsive to said control pulses and coupled to all of said gates for producing an output which controls the duration of each pulse; and
a second delay means responsive to the output of the first delay means and coupled to all of said gates for controlling the spacing between said pulses.

5. A pulse generator comprising, in combination,
a plurality of flip-flops each having a set terminal and a reset terminal, and each having terminals at which output signals are produced;
a plurality of input gates for the flip-flops, at least one connected to each set terminal of a flip-flop, and at least one connected to each reset terminal of a flip-flop;
connections from the flip-flop output terminals to the input gates for applying different permutations of signals to the gates for conditioning the gates to conduct in a selected order;
a first delay means coupled to all gates and responsive to an output produced by a gate, when enabled, for applying a disabling signal to the gate after a predetermined interval of time; and
a second delay means coupled to all gates for applying enabling signals to the gates conditioned to conduct, each a predetermined interval of time after the previously enabled gate is disabled.

6. A pulse generator comprising, in combination,
a plurality of flip-flops each having a set terminal and a reset terminal, and each having terminals at which output signals are produced;
a plurality of input "nor" gates for the flip-flops, at least one connected to each set terminal of a flip-flop, and at least one connected to each reset terminal of a flip-flop;
connections from the flip-flop output terminals to the input gates for applying different permutations of signals to the gates for conditioning the gates to conduct in a selected order;
a first delay means coupled to all gates and responsive to an output produced by a gate, when enabled, for applying a disabling signal to the gate after a predetermined interval of time; and
a second delay means coupled to all gates and responsive to the disabling signal produced by the first delay means for applying enabling signals to the gates conditioned to conduct, each a predetermined interval of time after the previously enabled gate is disabled.

7. A pulse generator comprising, in combination,
a plurality of flip-flops, each having a set terminal and a reset terminal and each having output terminals;
a plurality of input gates for the flip-flops, at least one connected to each set terminal of a flip-flop, and at least one connected to each reset terminal of a flip-flop;
connections from the flip-flop output terminals to the input gates for applying different permutations of signals to the gates for conditioning the gates to conduct in a selected order;
a first delay means coupled to all gates and responsive to the output produced by a gate, when enabled, for applying a disabling signal to the gate after a predetermined interval of time; and
a second delay means responsive to the disabling signal produced by the first delay means for enabling the next gate conditioned to conduct, after a predetermined interval of time.

8. In a circuit for generating a plurality of spaced pulses, each appearing on a separate output line;
a first delay means coupled to all of said lines, for producing disabling signals for controlling the duration of each pulse; and
a plurality of other delay means connected to the first delay means for producing respective outputs delayed successively greater time intervals from the time at which the disabling signal is produced for controlling the spacing between successive pulses.

9. A pulse generator comprising, in combination,
a plurality of flip-flops, each having a set terminal and a reset terminal, and each having output terminals;
a plurality of input gates for the flip-flops, at least one connected to each set terminal of a flip-flop, and at least one connected to each reset terminal of a flip-flop;
connections from the flip-flop output terminals to the input gates for applying different permutations of signals to the gates for conditioning the gates to conduct in a selected order;
a first delay means coupled to all gates and responsive to the output produced by a gate, when enabled, for applying a disabling signal to the gate after a predetermined interval of time;
a second delay means coupled to some of said gates and responsive to said disabling signal for applying enabling signals to said gates at a time $\Delta t_y$ after a disabling signal occurs; and
a third delay means coupled to some of said gates and responsive to a delayed disabling signal for applying an enabling signal to said gates a time $\Delta t_y$ and $\Delta t_z$ after a disabling signal occurs.

10. A pulse generator comprising, in combination,
(a) a plurality of logic gates;
(b) a first delay means coupled to all gates for producing a disabling signal an interval $\Delta t_1$ after any one of the gates is enabled;
(c) a second delay means coupled to the first delay means for producing an enabling signal an interval $\Delta t_2$ after the disabling signal occurs; and
(d) circuit means coupled to the first and second delay means for disabling the enabled gate in response to the disabling signal and enabling another gate in response to the enabling signal.

11. A pulse generator comprising, in combination,
(a) a plurality of logic gates;
(b) means coupled to one gate for enabling the same, whereby the gate produces an output;
(c) a first delay means coupled to all gates for producing a disabling signal an interval $\Delta t_1$ after any one of the gates is enabled;
(d) a second delay means coupled to the first delay means for producing an enabling signal an interval $\Delta t_2$ after each disabling signal occurs; and
(e) circuit means coupled to the first and second delay means for disabling the enabled gate in response to the disabling signal, thereby terminating said output, and enabling another gate in response to the enabling signal, thereby causing said other gate to produce an output.

12. A pulse generator comprising, in combination, (*a*) a plurality of logic gates, one of which is enabled and produces an output;

(*b*) a first delay means coupled to all gates and responsive to the respective outputs thereof for producing disabling signals, each an interval $\Delta t_1$ after a gate produces an output;

(*c*) a second delay means coupled to the first delay means and responsive to the respective disabling signals for producing enabling signals, each an interval $\Delta t_2$ after a disabling signal occurs; and (*d*) circuit means coupled to the first and second delay means for disabling each enabled gate at a time $\Delta t_1$ after that gate is enabled, in response to each disabling signal, and for enabling the other gates, in a given order, each an interval $\Delta t_2$ after disabling signal occurs.

13. A pulse generator comprising, in combination, (*a*) a plurality of logic gates, one of which is enabled and produces an output;

(*b*) a first delay means coupled through OR gate means and a flip-flop to all gates and responsive to the respective outputs thereof for producing disabling signals, each an interval $\Delta t_1$ after a gate produces an output;

(*c*) a second delay means coupled to the first delay means and responsive to the respective disabling signals for producing enabling signals, each an interval $\Delta t_2$ after a disabling signal occurs; and (*d*) circuit means coupled to the first and second delay means for disabling each enabled gate at a time $\Delta t_1$ after that gate is enabled, in response to each disabling signal, and for enabling the other gates, in a given order, each an interval $\Delta t_2$ after disabling signal occurs.

References Cited in the file of this patent

UNITED STATES PATENTS

| | | |
|---|---|---|
| 2,375,830 | Spencer | May 15, 1945 |
| 2,815,168 | Zukin | Dec. 3, 1957 |
| 2,881,320 | Goldberg | Apr. 7, 1959 |
| 2,906,891 | Scanlon | Sept 29, 1959 |
| 2,953,694 | Wilson | Sept 20, 1960 |
| 3,023,373 | Naylor | Feb. 27, 1962 |
| 3,050,713 | Harmon | Aug. 21, 1962 |